Patented Feb. 19, 1946

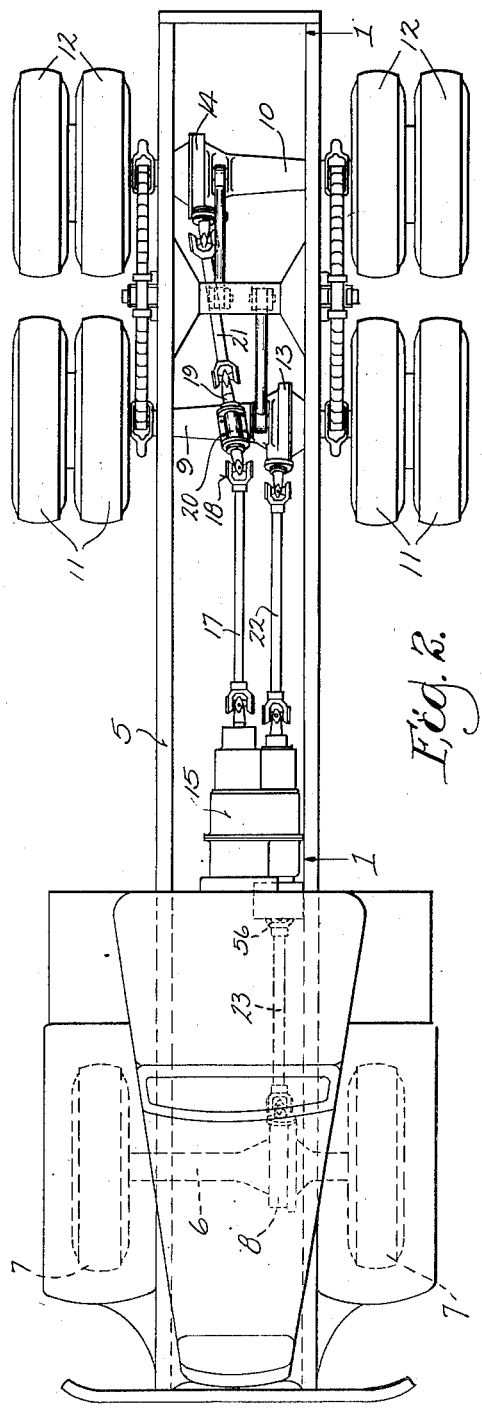

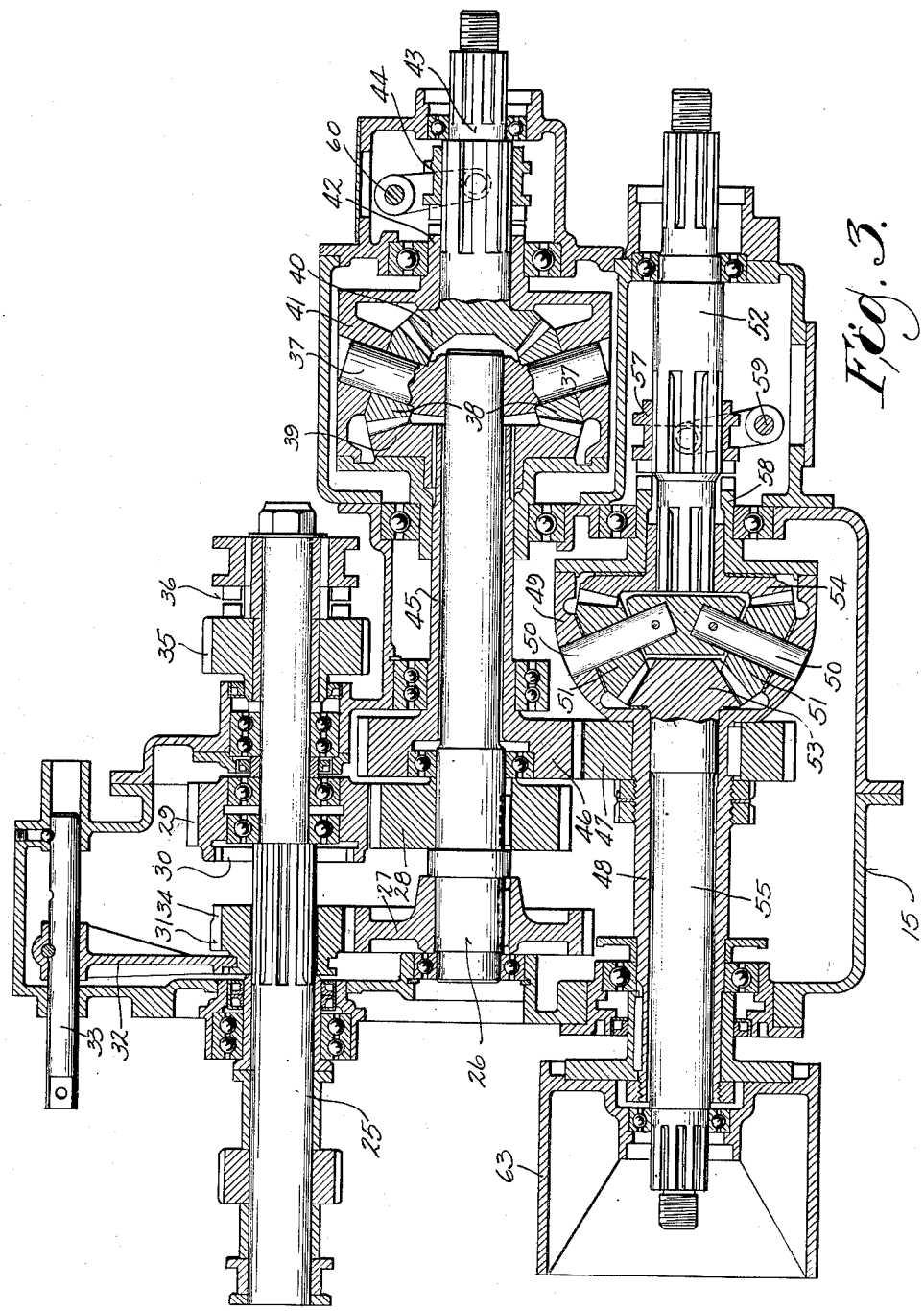

2,395,108

UNITED STATES PATENT OFFICE 2,395,108

DRIVE FOR MULTIPLE AXLE VEHICLES

Bartrum G. Donley and George D. Simonds, Clintonville, Wis., assignors to The Four Wheel Drive Auto Co., Clintonville, Wis., a corporation of Wisconsin Application July 17, 1942, Serial No. 451,360

21 Claims. (Cl. 180—22)

This invention relates to improvements in drives for multiple axle vehicles.

The particular embodiment of the invention herein disclosed is specifically devised for driving the front wheels and rear bogie wheels of a vehicle having a power driven front axle with two wheels and a rear bogie with two powered axles and eight wheels. Thus there are three axles to be driven but the power requirements of the bogie axles, having four wheels each, are greater than the power requirement of the front axle, which drives but two wheels. Accordingly, it is one of the broad objects of the invention to provide means available at or near the center of the vehicle for apportioning power to the various axles in accordance with their respective requirements. While the invention is described with particular reference to the specific type of vehicle aforesaid, those skilled in the art will understand how to apply the invention to vehicles of other specific types requiring similar treatment.

More specifically, it is a purpose of the invention to provide a power dividing center differential which will first take from the power source the particular amount of power required by one of the rear axles and will then divide the remaining power between the other rear axle and the front axle, one of the purposes of this arrangement being to avoid the relatively high gear ratios which would be required if all of the power were first divided between the front axle and the two bogie axles. By dividing the power in the manner proposed, the gear ratios in the two differentials of the center set are relatively slight and many of the parts are interchangeable.

It is another object of the invention to provide a novel and improved driving arrangement to the bogie axles by locating the differential cases of the respective bogie axles at opposite sides of the center line of the vehicle and by independently carrying the driving connections for the rear bogie axle over the top of the forward bogie axle and independently from the center gear set. In this connection a further objective is to provide a convenient and practicable disposition of the drive shaft to the rear axle and to provide support therefor on the forward bogie axle.

Another object of the invention is to provide a drive in which the center differential set is combined with a transmission, preferably of the dual range type, in such a manner as to carry power from the engine drive shaft, approximately at the longitudinal center line of the vehicle, both downwardly and laterally without the use of chains, so that the ultimate delivery of power to the front axle and the front bogie axle is provided well at one side of the vehicle, where the drive shaft to the front axle will laterally clear the engine and transmission.

In the drawings:

Fig. 1 is a view partially in side elevation and partially in longitudinal section on the line 1—1 of Fig. 2, showing a motor vehicle equipped with a drive in accordance with this invention.

Fig. 2 is a fragmentary plan view of the motor vehicle shown in Fig. 1.

Fig. 3 is a view greatly enlarged, showing the center differential transmission and transfer mechanism in a longitudinal plane which includes its several shafts.

Like parts are identified by the same reference characters throughout the several views.

Except for a special driving arrangement and its special rear bogie suspension, the vehicle may be conventional. The rear bogie suspension is the separate and sole invention of George D. Simonds and is separately claimed as such.

The vehicle frame 5 has a front axle 6 provided in the usual manner with dirigible power driven front wheels 7 and a conventional differential 8.

The rear axles 9 and 10 are provided with dual wheels 11 and 12 respectively, and have their respective differential cases 13 and 14 at opposite sides of the vehicle center line to equalize load and balance. The suspension of the frame from the bogie axles constitutes the subject of the sole application of Simonds and will not be described in detail herein.

Located at the intermediate point between the front axle and the bogie, is the center transmission and differential case 15. It may receive power from a main speed changing transmission which forms no part of the present invention and the case of which is indicated at 16. An upper power output drive shaft 17 leads through the universal 18 to a drive shaft section 19 which is mounted by means of a special bearing 20 on top of the front bogie axle 9. Thence another universally coupled drive shaft section 21 leads to the differential set 14 of the rear bogie axle 10.

Below and at the left of the power output drive shaft 17 is power output drive shaft 22 leading rearwardly from the center differential case 15 of the differential 13 of the front bogie axle 9. A third power output drive shaft 23 leads forwardly along the left side of the vehicle frame to the front axle differential 8. The several power output shafts 17 and 22, 23, are progressively removed both downwardly and laterally from the power input shaft hereinafter to be described, thus giving the desired mechanical position of the parts.

Referring now to Fig. 3, the construction of the central transmission and differential set will be described.

The set preferably incorporates a transmission, although this is not essential to the invention. As shown, the transmission incorporated in the case 15 is an auxiliary or dual range transmission, the effect of which is cumulative upon any speed changes effective in the main transmission 16. The power input shaft is shown at 25. The power output shaft of the dual range transmission is the shaft 26 which, if the dual range transmission were removed, might be regarded as a power input shaft of the power dividing differential set.

Shaft 25 and shaft 26 are coupled in the dual range transmission set by two sets of gears. To shaft 26 are fixed the gears 27 and 28. Pinion 29, meshing with gear 28, is rotatably mounted on shaft 25 and is provided in its face with a toothed recess constituting a toothed clutch element at 30. The pinion 31 is splined to shaft 25 to slide axially thereon and is moved by a shifter 32 mounted on the axially reciprocable shifting rod 33. Pinion 31 is normally meshed with gear 27 as shown but, upon being moved axially along its spline, it may be disengaged from gear 27 and its clutch teeth 34 may be engaged with the toothed clutch element 30 of pinion 29. Thus drive is selectively possible at either of two predetermined ratios from shaft 25 to shaft 26.

Shaft 25 may be extended through the back side of the casing 15 and provided with a power take-off comprising a floating pinion 35 and a clutch member 36 for selectively coupling such pinion to the shaft. This, however, is no direct part of the invention, its only significance being the fact that the disposition of the parts of my improved transmission make space available for such a take-off.

Shaft 26 extends centrally into the first of the two power dividing differentials used in this device. It carries at 37 the arms of a differential spider on which the differential pinions 38 are mounted. These arms are rearwardly inclined so that as shaft 26 rotates, the arms describe a path which represents the periphery of a rather flat cone. The differential pinions 38 mesh with the differential gears 39 and 40, the ratio of which, for the purposes of the described exemplification, is 3 to 2. Gear 39 has, in practice, 30 teeth, while gear 40 has 20 teeth. The pinions 38 may have any desired number of teeth, and in practice are provided with 16.

The outer ends of the spider arms 37 may be anchored in a differential cage 41 having fore and aft bearings and provided at 42 with a rearwardly extending sleeve with exposed clutch teeth. The driven differential shaft 43 which extends rearwardly from the set carries differential gear 40 and is provided with splines upon which the clutch jaw 44 is reciprocable to and from engagement with the clutch teeth of the cage sleeve 42, this arrangement being used when desired for the purpose of locking this differential out of action by clutching the cage to the output shaft 43. This output shaft 43 is coupled by means of universal joint 43a (Fig. 1) with the shaft 17 leading to the rear bogie axle.

Differential gear 39 is mounted on a sleeve shaft 45 which extends forwardly from the gear set concentrically with the power input shaft 26. At its forward end the sleeve shaft 45 carries a gear 46 meshing with a gear 47 upon a sleeve shaft 48 which is connected to the cage 49 of the second differential set and constitutes the power input shaft therefor. The arms 50 of cage 49 carry pinions 51 and are disposed obliquely at corresponding angles so that, like the arms 37 of the first differential, they describe a rather flat cone in the course of their rotation with the sleeve shaft 48. In the case of the arms 50, however, their inclination is forwardly from the axis of the sleeve shaft 48, whereas the arms 37 were inclined rearwardly from the axis of shaft 26.

Meshing with the pinions 51 are gears 53 and 54. Gear 53 is mounted on shaft 55 with which the front drive shaft 23 is coupled by means of the universal 56 (Fig. 1). Gear 54 is mounted upon the shaft section 52 which is universally coupled to the drive shaft 22 leading to the front axle of the rear bogie (Fig. 1). The ratio between the teeth of gear 53 and the teeth of gear 54 is 1 to 2. In practice, gear 54 has 30 teeth and gear 53 has 15 teeth. The pinions 51, like the pinions 38 in the differential first described, may have 16 teeth, although the exact number is unimportant.

A clutch member 57 slidably mounted on suitable splines of shaft 52 has jaws engageable with clutch jaws on a sleeve 58 connected with the differential case 49 and serving, when the clutch jaws are mutually engaged, to lock the differential cage 49 to the driven shaft 52, thereby placing this differential out of action. Rock shafts 59 and 60 are provided with shifting forks connected to the differential lock clutches 57 and 44 respectively, and are connected by link rods 61 and 62 respectively (Fig. 1), with a suitable control or controls (not shown) in the driver's cab.

If desired, the sleeve shaft 48 may be extended forwardly about the power output shaft 55 and provided at 63 with a drum to which a parking brake is applicable.

As disclosed in Higgins Patent 2,267,562 of December 23, 1941, it is desirable, in a vehicle having two front wheels and a rear bogie with eight wheels, that the power should be divided between the various axles in the general ratio of the number of wheels, $\frac{1}{5}$ of the power going to the front axle and $\frac{2}{5}$ to each of the bogie axles. In the aforesaid patent, however, $\frac{1}{5}$ of the power for the front axle was first taken off from the remaining $\frac{4}{5}$, this requiring a ratio of gears in the compensating center differential of 1 to 4. The present organization avoids so high a ratio. The ratio of gear 39 to gear 40 in the first gear differential being a ratio of 3 to 2, it will be apparent that $\frac{2}{5}$ of the power delivered to the spider will normally go rearwardly to the rear bogie axle, while the remaining $\frac{3}{5}$ is subject to redivision. This $\frac{3}{5}$ is delivered to the second compensating differential, which has a ratio of 2 to 1 between gears 54 and 53. Thus, one of the remaining fifths of the original power is delivered forwardly through shaft 55 to the front wheel drive shaft 23, while the last $\frac{2}{5}$ of the original power is delivered rearwardly through the output shaft 52 and drive shaft 22 to the forward shaft of the rear bogie.

In effect, the ultimate distribution of power is the same as in the Higgins patent but, in addition to avoiding any sharp reduction in either compensating differential, the present invention works smoothly by taking off the power required for the front axle between the two components of power which are delivered respectively to the two bogie axles. Moreover, the second power dividing differential is now unitarily mounted at the center of the vehicle and its weight is sustained by the vehicle springs instead of being imposed on either of the bogie axles as unsprung weight.

The resulting organization is extremely compact and the succession of gears through which the power is carried in passing through the transmission and the two compensating differentials delivers the power from a point high on the vehicle center line downwardly and to the left (as viewed in the direction of vehicle travel) so that the output for drive shaft 17 is derived slightly below and to the left of the point of input while the output for drive shafts 22 and 23 is considerably below and to the left of the point of input. This facilitates the delivery of power to each of the axles in a most desirable manner, and the delivery of power through the rear bogie axle differential in case 14 is further improved by the provision of a bearing at 20 on the front bogie axle so that no relative movement between the two bogies axles can cause damage or interfere with power transmission.

We claim:

1. A drive to the axles of a vehicle having a power propelled front axle and power propelled bogie axles, said drive including the combination with the vehicle frame and the axles aforesaid, of a power dividing multiple differential gear set on said frame, power input means operatively connected with said set, and drive shafts operatively connected individually with said differential gear set and differentially coupled therethrough with each other and leading from said differential gear set forwardly to the front axle and rearwardly independently to the respective bogie axles, whereby all of said shafts are driven through said differential gear set and are respectively differentially operable with respect to each other.

2. The structure defined in claim 1 in which the said multiple differential gear set has power input and output means and the power input means is substantially at the vehicle center line, the power output means to one of said bogie axles drive shafts is below the frame and close to the vehicle center line, and the power output means to the front axle and to another bogie axle are still lower below the frame and farther from said center line.

3. In a motor vehicle, the combination with a frame, a set of power driven front wheels and two sets of rear bogie power driven wheels, said wheels having driving axles, of power dividing differential means on said frame between the front wheels and the bogie wheels, drive shafts leading from said differential means forwardly to the front wheel axles and rearwardly to the axles of the respective sets of bogie wheels, said differential means comprising a pair of compensating power-dividing differentials each having an input drive member and two output drive members, one of the output drive members of the first differential being connected to the drive shaft of a rear bogie axle and the other being connected to the input drive member of the second differential, the output drive members of the second differential being connected respectively to the drive shafts of the other bogie axle and the front axle.

4. In a vehicle, the combination with a frame and power propelled front axle and power propelled bogie axles, of a gear set on said frame between said front and said bogie axles and comprising change speed transmission gearing and power dividing differential means provided with drive shafts leading respectively forwardly to the front axle and rearwardly independently to the respective bogie axles, said differential means comprising two separate differentials each having an input shaft and two output shafts, said change speed gearing being operatively connected with the input shaft of the first of said differentials, one of the output shafts of the first differential being connected to the input shaft of the other differential, the drive shafts to the bogie axles being connected with output shafts of different differentials and the remaining output shaft of the second differential being connected to the drive shaft to the front axle.

5. A drive to the axles of a vehicle having a power propelled front axle and power propelled bogie axles, said drive including the combination with the axles aforesaid; of a pair of differential gear sets, each set comprising an input shaft, a pair of output shafts and gearing interconnecting the several shafts; a connection from one output shaft of one of said differentials to the input shaft of the other; and connections from output shafts of the respective differentials independently to the respective bogie axles; the remaining output shaft of the second differential being provided with a motion transmitting connection to the front axle.

6. A drive to the axles of a vehicle having a power propelled front axle provided with two wheels and power propelled bogie axles each provided with four wheels, said drive including the combination with a vehicle frame and the axles aforesaid, of a differential case mounted on the frame at a point intermediate the front and bogie axles, a plurality of power dividing differential gear sets in the case corresponding to the number of bogie axles, each of said gear sets comprising a driving cage and pinion and differentially toothed driven gears, a connection from one driven gear of one of said sets to a bogie axle, a connection from a larger gear of the same set to the driving cage of the other differential, and connections from the driven gears of said other differential to the front axle and another rear bogie axle respectively, the rear bogie axle connection being taken from the larger driven gear of the last mentioned set.

7. The device of claim 6 wherein the driven gears of the set first mentioned have a ratio of 3 to 2 and the driven gears of the differential set last mentioned have a ratio of 1 to 2.

8. In a power dividing and compensating apparatus for the purposes described, the combination with a transmission shaft and pinion mounts connected for rotation therewith, of differential pinions carried by the respective mounts, respectively larger and smaller differential gears connected through said pinions and coaxial with said shaft, a sleeve to which the larger of said gears is connected and which is concentric with said transmission shaft, a power output shaft to which the smaller of said gears is connected, a second sleeve mechanically connected to receive motion from the sleeve first mentioned, differential pinion mounts connected with the second sleeve, differential pinions carried by said mounts, respectively small and large gears meshing with said pinions and interconnected thereby and mounted for rotation coaxially with said second sleeve, an output shaft connected with the smaller of said gears and extending through the second sleeve, and a third output shaft connected with the larger of said gears.

9. The device set forth in claim 8 in which the large and small gears first mentioned have a ratio of 3 to 2 and the small and large gears last mentioned have a ratio of 1 to 2.

10. A device of the character described, comprising the combination with a power input shaft and a transmission shaft, of change speed gearing mounted on the respective shafts, clutch means for controlling the transmission of motion by said gearing between said shafts, a sleeve concentric with the transmission shaft, a differential gear on said sleeve beyond which said transmission shaft projects, a spider on the transmission shaft having angularly disposed arms, beveled pinions mounted on the arms and meshing with said gear, a power output shaft aligned with the transmission shaft beyond said spider and provided with a relatively smaller differential gear with which said pinions mesh, a connecting gear mounted on said sleeve, a second sleeve provided with a connecting gear meshing with the first connecting gear, a cage connected with the second sleeve and provided with angularly inclined posts, differential pinions mounted on said posts, a small gear with which said pinions mesh, a power output shaft connected with the small gear and extending through said sleeve, and a third power output shaft aligned with the second mentioned power output shaft and provided with a large gear with which mesh the pinions carried by the posts of said cage.

11. A device of the character described, comprising the combination with a pair of compensating power dividing differentials each having an input shaft and two output shafts, and each differential having gears of different sizes on its respective output shafts, means connecting the larger gear of one of said differentials with the input shaft of the other, the larger gears of the respective differentials being oppositely arranged and each of said differentials having differential pinions connecting its differentially diametered gears and disposed upon axes which are inclined, the inclination of the axes of the differential pinions of the respective sets being opposite and the output shaft connected with the smaller gear of the first differential projecting parallel to the output shaft connected with the larger gear of the second differential.

12. A device of the character described, comprising a first differential having an input shaft and an output sleeve shaft in concentric arrangement and a second output shaft aligned with the input shaft, large and small differential gears connected with the sleeve shaft and the second output shaft respectively, a cage connected with the input shaft and provided with pinions operatively meshing between said gears and disposed upon axes inclined toward the smaller gear from the input shaft, said output sleeve shaft extending back along the input shaft, a second differential provided with an input sleeve shaft in operative driven connection with said output sleeve shaft of the first differential, a second differential cage connected with the input sleeve shaft, a pair of output shafts for the second differential, the first of which extends past the differential first mentioned, a relatively large differential gear on the first output shaft of the second differential, a relatively small differential gear on the other output shaft of the second differential, said other output shaft extending through the input sleeve shaft of the second differential, and pinions carried by said cage and operatively meshing between the gears of the second differential, said pinions being inclined away from the first output shaft of the second differential and oppositely with respect to the inclination of the pinions of the first differential.

13. In a device of the character described, the combination with first and second power dividing differentials each including a large gear and a small gear, output shafts connected therewith and pinions operatively meshing between said gears, means supporting the respective pinions, and input shafts connected with said means for the rotation of the respective sets of pinions, an output shaft of the first of said differentials being connected with the input shaft of the second of said differentials and with the larger gear of the first differential.

14. The device of claim 13 in which each of the differentials is provided with means for locking its pinion supporting means to one of its output shafts.

15. The device of claim 13 in further combination with a brake drum operatively connected with the pinion supporting means of the second differential.

16. A power dividing differential gear set for a vehicle having multiple rear axles and driven front wheels, said gear set comprising in a single unit an input shaft, three output shafts, one of which is forwardly directed to drive the front wheels, and two of which are individually connected to respective rear axles, and a multiple differential gear means differentially connecting all of the several output shafts for differential movement with respect to each other and providing a driving connection from said input shaft through said means to the several output shafts.

17. A power dividing differential gear set for a vehicle having driven front wheels and a plurality of rear axles with driven wheels, said gear set comprising in a single unitary assembly; a differential having output shafts respectively directed forwardly and rearwardly for driving respectively the front wheels and the wheels of one rear axle, a driving cage, and differential gears operatively connecting the output shaft and cage; and another differential having a driving cage, differential gearing, and output shafts, one of which is directed rearwardly to drive the wheels of another rear axle, and the other of which is connected to drive the cage of the differential first mentioned.

18. In a motor vehicle, the combination with at least three sets of driven wheels, of a single unitary transmission including a succession of power dividing differentials, each including driving means, differential means, and a plurality of differentially driven means; a connection between one driven means of a given differential and the driving means of a successive differential whereby to provide for differential action between the remaining driven means of the given differential and the respective driven means of the successive differential; and driving connections from other differentially driven means of the several differentials to respective sets of wheels, whereby all such sets are in differentially driven relation to each other.

19. The combination with a vehicle frame having a power propelled front axle and power propelled bogie axles, each of the several axles being provided with its own differential, of a power dividing center transmission on said frame, an input shaft for said transmission, separate output shafts leading from the transmission independently to the differentials of the front axle and the respective bogie axles, said transmission unitarily including at least first and second differential gear sets each comprising a driving gear support, planetary gear means carried thereby, and driven gears meshing with the planetary gear means, said transmission further comprising means whereby said input shaft is operatively connected with the driving gear support of said first differential gear set and one of its output gears is connected with the driving gear support of said second differential gear set, the other of its output gears being connected with one of the output shafts leading to one of said bogie axles, one output gear of the second differential gear set of said transmission being connected with an output shaft leading to the differential of the front axle, the other output gear of the second differential gear set being connected with an output shaft leading to the differential of another bogie axle.

20. The combination with a vehicle having a power propelled front axle and first and second power propelled bogie axles, said front axle being provided with a first differential and said bogie axles respectively with second and third differentials, a central unitary transmission set comprising a fourth differential and a fifth differential, each of which includes input means and a plurality of output means, and separate drive shafts leading individually from said transmission set to the first, second and third differentials, said transmission set including a power input for the driving means of the fourth differential and an operative motion transmitting connection from one of the output means of the fourth differential to the input means of the fifth differential, the other output means of the fourth differential being operatively connected to drive one of said shafts leading to the differential of a rear bogie axle, and the output means of the fifth differential being respectively operatively connected to output shafts leading respectively to the differential of the front axle and to the differential of the other bogie axle.

21. In a differential gear set, a first differential having an input shaft, a cage, planetary gearing carried on the cage, first and second driven shafts coaxial with each other and with the shaft first mentioned and provided with gearing meshing with the planetary gearing carried by the cage, said first driven shaft having an output coupling; in combination with a second differential having an input shaft, a cage, planetary gearing mounted on the cage, and third and fourth driven shafts coaxial with said last mentioned cage and with each other and provided with gearing meshing with the planetary gearing last mentioned; together with power input means for said second differential in operative driven connection with the second shaft of the first differential, said fourth shaft having an output coupling, and said third and fourth shafts being in differential connection with each other and with said first driven shaft.

BARTRUM G. DONLEY.
GEORGE D. SIMONDS.